3,186,961
PLASTICIZED POLYCARBONATE RESINS
James K. Sears, Webster Groves, Mo., assignor to Monsanto Company, a corporation of Delaware
No Drawing. Filed Oct. 8, 1962, Ser. No. 229,182
23 Claims. (Cl. 260—30.4)

This invention relates to new and useful compositions comprising polycarbonate resins. It particularly relates to plasticized polycarbonate resin compositions and to a novel method for preparing such compositions.

The polycarbonate resins have found many useful applications in the plastics industry because their physical properties, coupled with chemical properties, are comparable to those of polystyrene, polymethacrylate and cellulose esters. The polycarbonate resins are widely employed to fabricate hard, rigid and solid articles such as cams, bearings, switches, levers, hardware, pipes, fittings, valves, etc. The industrial use of these resins is considerably restricted, however, since the resins are employed in the aforementioned applications without the use of a plasticizer.

To produce more versatile and useful polycarbonate resin compositions, which are clear, strong, tough and flexible materials, it is necessary to combine a plasticizer or plasticizers with the polycarbonate resin.

A major drawback encountered in plasticizing polycarbonate resins with materials that are normally used as plasticizers for other polymers, such as vinyl resins, is the inability to obtain a clear resin composition having satisfactory physical properties such as tensile strength, etc.

Plasticizers are ordinarily incorporated in polymers by mixing the powdered resin with the plasticizer, followed by a mixing or kneading operation, and then curing the mix at an elevated temperature.

When an attempt is made to plasticize a polycarbonate resin by mixing the polycarbonate resin and plasticizer at 200–300° C. and allowing the product to cool to room temperature, the resultant composition is not only brittle and cheesy, but also opaque, and it exhibits extreme crystallization characteristics and excessive exudation. As a result, prior to the present invention, the use of polycarbonate resins has been impractical in many important fields of application such as flexible sheets, film, tubing, electrical insulation and the like.

It is therefore an object of this invention to provide novel and improved polycarbonate resin compositions.

A more specific object of this invention is to provide a clear, plasticized polycarbonate resin composition having good tensile strength and flexibility and which exhibits extremely low plasticizer loss on aging.

An additional object is the preparation of polycarbonate resin composition which are characterized by improved stability on exposure to light.

Another object of this invention is to provide a novel method of preparation of plasticized polycarbonate resins.

Further objects, advantages and features of this invention will be apparent to those skilled in the art from the following description and claims.

In accordance with this invention, the above and related objects are attained by a process which comprises (1) intimately mixing a polycarbonate resin and a compatible plasticizer, (2) heating the mixture above the melting temperature of the resin in the presence of the plasticizer, and (3) subsequently quench cooling the fused material to at least below 50° C.

The term "polycarbonate resin," as used herein, is meant to designate thermoplastic resins of linear aliphatic, cycloaliphatic and aromatic polyesters of carbonic acid. These thermoplastic polycarbonates may be produced from a great number of aliphatic, cycloaliphatic and aromatic dihydroxy compounds.

Illustrative of the aliphatic dihydroxy compounds which can be employed are ethylene glycol, diethylene glycol, triethylene glycol, polyethylene glycol, thioglycol, ethylene dithioglycol, 1,3-propanediol, 1,3-butanediol, 1,4-butanediol, 1,3-(2-methyl)propanediol, 1,5-pentanedial, 1,6-hexanediol, 1,8-octanediol, 1,10-decanediol. Illustrative of cycloaliphatic dihydroxy compounds are 1,4-cyclohexanediol, 1,3-(2-methyl)propanediol, 1,5-pentanediol, 1,6-hexylene)propane and 2,6-dihydroxy-decahydronaphthalene. Illustrative of the aromatic dihydroxy compounds are hydroquinone, resorcinol, pyrocatechol, 4,4'-dihydroxydiphenyl, 1,6-dihydroxynaphthalene, 2,6-dihydroxy naphthalene, 1,4-dihydroxynaphthalene, 1,5-dihydroxynaphthalene, dihydroxyanthracene, 2,2'-dihydroxydinaphthyl-1,1' and o,m,p-hydroxybenzyl alcohol and the like; di-(monohydroxyaryl)sulfones such as di-(4-hydroxyphenyl)sulfone, di-(2-hydroxyphenyl)sulfone, di-(3-hydroxyphenyl)sulfone, di-(4-hydroxy-2-methylphenyl)sulfone, di-(4-hydroxy-3-methylphenyl)sulfone, di-(2-hydroxy-4-methylphenyl)sulfone, di-(4-hydroxy-2-ethylphenyl)sulfone, di-(4-hydroxy-3-ethylphenyl)sulfone, di-(4-hydroxy-2-tert.-butylphenyl)sulfone, di-(4-hydroxy-3-tert.-butylphenyl)sulfone, di-(2-hydroxy-1-naphthyl)sulfone and the like;

Di-(monohydroxyaryl)alkanes such as:

1,1-di(4-hydroxyphenyl)ethane,
1,1-di(4-hydroxyphenyl)propane,
1,1-di(4-hydroxyphenyl)butane,
1,1-di(4-hydroxyphenyl)-2-methyl-propane,
1,1-di(4-hydroxyphenyl)heptane,
1,1-di-(4-hydroxyphenyl)-1-phenylmethane,
Di-(4-hydroxyphenyl)-4-methylphenyl-methane,
Di-(4-hydroxyphenyl)-4-ethylphenyl-methane,
Di-(4-hydrooxyphenyl)-4-isopropylphenyl-methane,
Di-(4-hydroxyphenyl)-4-butylphenyl-methane,
Di-(4-hydroxyphenyl)benzylmethane,
Di-(4-hydroxyphenyl)-α-furylmethane,
2,2-di(4-hydroxyphenyl)octane,
2,2-di(4-hydroxyphenyl)nonane,
Di-(4-hydroxyphenyl)-1-α-furyl-ethane,
1,1-di(4-hydroxpyhenyl)cyclopentane,
2,2-di(4-hydroxyphenyl)decahydronaphthalene,
2,2-di(4-hydroxy-3-cyclohexylphenyl)propane,
2,2-di(4-hydroxy-3-isopropylphenyl)butane,
1,1-di(4-hydroxy-3-methylphenyl)cyclohexane,
2,2-di(4-hydroxy-3-butylphenyl)propane,
2,2-di(4-hydroxy-3-phenylphenyl)propane,
2,2-di(4-hydroxy-2-methylphenyl)propane,
1,1-di(4-hydroxy-3-methyl-6-butylphenyl)butane,
1,1-di(4-hydroxy-3-methyl-6-tert.-butylphenyl)ethane,
1,1-di(4-hydroxy-3-methyl-6-tert.-butylphenyl)propane,
1,1-di(4-hydroxy-3-methyl-6-tert.-butylphenyl)butane,
1,1-di(4-hydroxy-3-methyl-6-tert.-butylphenyl)isobutane,
1,1-di(4-hydroxy-3-methyl-6-tert.-butylphenyl)heptane,
1,1-di(4-hydroxy-3-methyl-6-tert.-butylphenyl)-1-phenylmethane,
1,1-di(4-hydroxy-3-methyl-6-tert.-butylphenyl)-2-methyl-2-pentane,
1-1-di(4-hdroxy-3-methyl-6-tert.-butylphenyl)-2-ethyl-2-hexane,
1,1-di(4-hydroxy-3-methyl-6-tert.-amylphenyl)butane,
Di-(4-hydroxyphenyl)methane, 2,2-di(4-hydroxyphenyl)propane,
1,1-di(4-hydroxyphenyl)cyclohexane,
1,1-di(4-hydroxy-3-methylphenyl)cyclohexane,
1,1-di(2-hydroxy-4-methylphenyl)butane,
2,2-di(2-hydroxy-4-tert.-butylphenyl)propane,
1,1-di(4-hydroxyphenyl)-1-phenylethane,
2,2-di(4-hydroxyphenyl)butane,
2,2-di(4-hydroxyphenyl)pentane,
3,3-di(4-hydroxyphenyl)pentane,
2,2-di(4-hydroxyphenyl)hexane,
3,3-di(4-hydroxyphenyl)hexane,
2,2-di(4-hydroxyphenyl)-4-methylpentane,
2,2-di(4-hydroxyphenyl)heptane,
4,4-di(4-hydroxyphenyl)heptane,
2,2-di(4-hydroxyphenyl)tridecane,
2,2-di(4-hydroxy-3-methylphenyl)propane,
2,2-di(4-hydroxy-3-methyl-3'-isopropylphenyl)butane,
2,2-di(3,5-dichloro-4-hydroxyphenyl)propane,
2,2-di(3,5-dibromo-4-hydroxyphenyl)propane,
Di-(3-chloro-4-hydroxyphenyl)methane,
Di-(2-hydroxy-5-fluorophenyl)methane,
Di-(4-hydroxy-phenyl)phenylmethane,
1,1-di(4-hydroxyphenyl)-1-phenylethane, and the like.

The preferred class of dihydroxy compounds for use in the practice of this invention are the aromatic dihydroxy compounds and in particular the di-(monohydroxyaryl)-alkanes.

Polycarbonates of the aforesaid di-(monohydroxyaryl)-alkanes can be prepared by a number of methods known to those skilled in the art. For example, the di-(monohydroxyaryl)alkanes can be re-esterified with carbonic acid diesters, e.g., dimethyl-, diethyl-, dipropyl-, dibutyl-, diamyl-, dioctyl-, dicyclohexyl-, diphenyl-, and di-o,p-tolyl-carbonate and the like, at elevated temperatures of from about 50° C. to about 320° C.

Another method available for the preparation of polycarbonates involves the introduction of phosgene into solutions of di-(monohydroxyaryl)alkanes in organic bases, such as dimethylaniline, diethylaniline, trimethylaniline, pyridine and the like or into solutions of di-(monohydroxyaryl)alkanes in different organic solvents such as ligroin, cyclohexane, methylcyclohexane, benzene, toluene, xylene, chloroform, methylene chloride, carbon tetrachloride, trichloroethylene, dichloroethane, methyl acetate, ethyl acetate and the like, with the addition of an acid-binding agent, e.g. a tertiary amine.

Still another suitable process for producing polycarbonates comprises introducing phosgene into the aqueous solution or suspension of alkali metal salts such as lithium, sodium, potassium, and calcium salts of the di-(monohydroxyaryl)alkanes, preferably in the presence of an excess of a base such as lithium, sodium, potassium, and calcium hydroxide or carbonate. The polycarbonates precipitate from the aqueous solution.

The di-(monohydroxyaryl)alkanes can be reacted with bischloro-carbonates of di-(monohydroxylaryl)alkanes in the presence of inert solvents and acid-binding materials, e.g. tertiary amines.

The term "compatible plasticizer" as used herein includes any plasticizer which does not manifest itself in exudation, blooming or tack development on the surface of the plastic article immediately upon compounding or during the average use life of the article. Any plasticizer capable of forming a single phase with the polycarbonate resin, whether it be a high boiling solvent, liquid, solid or gum of synthetic or natural origin, and which does not exhibit the aforedescribed deleterious characteristics, is encompassed by the practice of this invention. Such a compatible plasticizer produces a clear product with the polycarbonate resin.

A wide variety of different types of plasticizers can be used in the process of this invention. Such plasticizers can be selected from the group consisting of (a) Esters having up to 22 carbon atoms formed by the reaction of an aliphatic monocarboxylic acid having from 2 to 18 carbon atoms and an alcohol selected from the group consisting of monohydric alcohols having from 1 to 6 carbon atoms, dihydric alcohols having from 2 to 8 carbon atoms, glycerol, tetrahydrofurfuryl alcohol, and ether alcohols having from 2 to 8 carbon atoms, such esters being compatible with the polycarbonate resin;

(b) Esters formed by the reaction of an aliphatic polycarboxylic acid having from 6 to 10 carbon atoms and an alcohol selected from the group consisting of monohydric alcohols having from 1 to 11 carbon atoms, tetrahydrofurfuryl alcohol and ether alcohols having from 2 to 8 carbon atoms, such esters being compatible with said resin;

(c) Esters formed by the reaction of an aryl carboxylic acid having from 7 to 10 carbon atoms and an alcohol selected from the group consisting of monohydric alcohols having from 1 to 13 carbon atoms, dihydric alcohols having from 2 to 6 carbon atoms, glycerol, pentaerythritol, phenols having from 6 to 8 carbon atoms, tetrahydrofurfuryl alcohol, and ether alcohols having from 2 to 8 carbon atoms, such esters being compatible with said resin;

(d) Phosphoric acid derivatives selected from the group consisting of trialkyl phosphates, trialkoxy alkyl phosphates, triaryl phosphates, alkyl aryl phosphates, trialkylaryl phosphates and trihaloalkyl phosphates having 2 to 18 carbons in the alkyl group;

(e) Sulfonamides selected from the group consisting of N-alkyl and N-allyl arylsulfonamides, arylsulfonamides, hydroxyalkyl arylsulfonamides, N,N-dialkyl arylsulfonamides, and N,N-bis(cyanoalkyl) arylsulfonamides;

(f) Hydrocarbons selected from the group consisting of polyphenyls, chlorinated polyphenyls, alkylated polyphenyls, partially hydrogenated polyphenyls, alkyl aryl hydrocarbons and partially hydrogenated alkyl aryl hydrocarbons wherein the alkyl group contains from 2 to 4 carbons;

(g) Cyanamides selected from the group consisting of allyl cyanamide, alkyl cyanamides and aralkyl cyanamides wherein the alkyl group contains from about 1 to about 10 carbon atoms and the aralkyl group contains from about 7 to about 9 carbon atoms; and (h) Epoxy compounds selected from the group consisting of epoxy esters, glycidols, and glycidyl ethers.

Non-limiting examples of plasticizers encompassed by the aforementioned classes of plasticizers suitable for use in the practice of this invention include the following:

(a) *Aliphatic monocarboxylic acid esters*, for example, acetates such as glycerol monoacetate, glycerol diacetate, glycerol triacetate and glycerol ether acetate; propionates such as glycerol tripropionate, ethylene glycol dipropionate, diethylene glycol dipropionate and triethylene glycol dipropionate; butyrates such as glycerol butyrate and ethylene glycol dibutyrate; laurates such as n-butyl laurate, ethylene glycol monolaurate, 1,2-propylene glycol monolaurate, diethylene glycol monolaurate, methyl cellosolve laurate, butyl cellosolve laurate and polyethylene glycol monolaurate; oleates such as methyl oleate, propyl oleate, isopropyl oleate, butyl oleate, amyl oleate, glycerol monoleate, tetrahydrofurfuryl oleate, ethylene glycol monomethyl ether oleate, ethylene glycol monobutyl ether oleate, diethylene glycol monoleate and 1,2-propylene glycol monoleate; palmitates such as isopropyl palmitate, butyl palmitate, tetrahydrofurfuryl palmitate and methyl cellosolve palmitate; ricinoleates such as methyl ricinoleate, butyl ricinoleate, methyl acetyl ricinoleate, n-butyl acetyl ricinoleate, ethylene glycol ricinoleate, propylene glycol ricinoleate, methoxyethyl acetyl ricinoleate, diethylene glycol monoricinoleate and glyceryl ricinoleate; and stearates such as butyl stearate, 1,2-propylene glycol monostearate and ethylene glycol monoethyl ether stearate;

(b) *Aliphatic polycarboxylic acid esters*, for example, adipates such as diethyl adipate, dibutyl adipate, diisobutyl adipate, di-n-hexyl adipate, di(1,3-dimethyl butyl) adipate, dicapryl adipate, diisooctyl adipate, di-(2-ethylhexyl)

adipate, n-octyl n-decyl adipate mixture, dinonyl adipate, didecyl adipate, dibenzyl adipate, ditetrahydrofurfuryl adipate, di(butyl cellosolve) adipate and di-(butyl carbitol) adipate; azelates such as diisobutyl azelate, di-(2-ethylbutyl) azelate, di-(2-ethylhexyl) azelate, diisooctyl azelate and dibenzyl azelate; sebacates and isosebacates such as dimethyl sebacate, diethyl sebacate, dibutyl sebacate, dihexyl sebacate, dioctyl sebacate, diisooctyl sebacate, dicapryl sebacate, dibenzyl sebacate, butyl benzyl sebacate, di-(1,3-dimethyl butyl) sebacate, dibutoxyethyl sebacate, di-(butyl cellosolve) sebacate and di-(2-ethylhexyl) isosebacate; and citrates such as triethyl citrate, tri-n-butyl citrate, acetyl triethyl citrate and acetyl tri-n-butyl citrate;

(c) *Aryl carboxylic acid esters*, for example, benzoates such as diethylene glycol dibenzoate, dipropylene glycol dibenzoate, triethylene glycol dibenzoate, pentaerythritol tetrabenzoate, 3-methyl-1,5-pentanediol dibenzoate and 2-ethylhexyl-p-oxybenzoate; phthalyl glycollates such as methyl phthalyl methyl glycollate, methyl phthalyl ethyl glycollate, ethyl phthalyl ethyl glycollate, propyl phthalyl propyl glycollate, butyl phthalyl butyl glycollate, isobutyl phthalyl isobutyl glycollate, hexyl phthalyl hexyl glycollate, cyclohexyl phthalyl cyclohexyl glycollate, 2-ethylhexyl phthalyl 2-ethylhexyl glycollate, decyl phthalyl decyl glycollate, decyl phthalyl 2-ethylhexyl glycollate, dodecyl phthalyl dodecyl glycollate, tridecyl phthalyl tridecyl glycollate, benzyl phthalyl decyl glycollate, phenyl phthalyl ethyl glycollate, tolyl phthalyl ethyl glycollate, xylyl phthalyl ethyl glycollate, benzyl phthalyl ethyl glycollate and tetrahydrofurfuryl phthalyl ethyl glycollate; phthalates and isophthalates such as dimethyl phthalate, diethyl phthalate, dipropyl phthalate, dibutyl phthalate, diisobutyl phthalate, diamyl phthalate, dihexyl phthalate, di-n-octyl phthalate, diisooctyl phthalate, dicapryl phthalate, di-(2-ethylhexyl) phthalate, dinonyl phthalate, didecyl phthalate, butyl isohexyl phthalate, butyl octyl phthalate, butyl decyl phthalate, decyl octyl phthalate, diallyl phthalate, butyl cyclohexyl phthalate, dicyclohexyl phthalate, methylcyclohexyl isobutyl phthalate, di-(methylcyclohexyl) phthalate, butyl benzyl phthalate, cresyl benzyl phthalate, benzyl cyclohexyl phthalate, diphenyl phthalate, dibenzyl phthalate, glycerol phthalate, dimethoxyethyl phthalate, diethoxyethyl phthalate, dibutoxyethyl phthalate and di-(2-ethylhexyl) isophthalate; terephthalates such as diisobutyl terephthalate and di-(2-ethylhexyl) terephthalate; trimellitates such as trimethyl trimellitate, triethyl trimellitate, tributyl trimellitate, trihexyl trimellitate, triisooctyl trimellitate, tri-2-ethylhexyl trimellitate and triisodecyl trimellitate; and pyromellitates such as tetramethyl pyromellitate, tetraethyl pyromellitate, tetrabutyl pyromellitate and tetrahexyl pyromellitate;

(d) *Phosphoric acid derivatives* such as triethyl phosphate, tributyl phosphate, trioctyl phosphate, tri-(2-ethylhexyl) phosphate, tributoxyethyl phosphate, triphenyl phosphate, tricresyl phosphate, cresyl diphenyl phosphate, hexyl diphenyl phosphate, 2-ethylbutyl diphenyl phosphate, octyl diphenyl phosphate, 2-ethylhexyl diphenyl phosphate, isooctyl diphenyl phosphate, nonyl diphenyl phosphate, decyl diphenyl phosphate, 2-butyloctyl diphenyl phosphate, tridecyl diphenyl phosphate, tetradecyl diphenyl phosphate, octadecyl diphenyl phosphate, 2-ethylbutyl dicresyl phosphate, n-octyl dicresyl phosphate, isooctyl dicresyl phosphate, 2-ethylhexyl dicresyl phosphate, nonyl dicresyl phosphate, decyl dicresyl phosphate, 2-n-propylheptyl dicresyl phosphate, 2-butyloctyl dicresyl phosphate, tridecyl dicresyl phosphate, tetradecyl dicresyl phosphate, octadecyl dicresyl phosphate, trichloroethyl phosphate and tri-(dimethylphenyl) phosphate;

(e) *Sulfonamides* such as N-ethyl - o,p - toluenesulfonamide, N - ethyl - p - toluenesulfonamide, N-cyclohexyl-p-toluenesulfonamide, N-isopropyl-benzenesulfonamide, N-n-butyl-p-toluenesulfonamide, N-butyl glycollyl p-toluenesulfonamide, N-methyl benzenesulfonamide, N-n-propyl benzenesulfonamide, N-sec.-heptyl benzenesulfonamide, N - cyclohexyl benzenesulfonamide, N-methyl xylenesulfonamide, N - cyclohexyl diphenylsulfonamide, N - allyl benzenesulfonamide, N-allyl p-toluenesulfonamide, o,p-toluenesulfonamide, N,N-di-β-hydroxyethyl p-toluenesulfonamide, N,N - dimethyl benzenesulfonamide, N,N - diethyl benzenesulfonamide, N,N-di-n-butyl benzenesulfonamide, N,N-di-n-butyl p-toluenesulfonamide and N,N-di-n-butyl phenylenedisulfonamide; N,N - bis (cyanoalkyl) arylsulfonamides, such as, N,N-bis(cyanoethyl) benzenesulfonamide, N,N-bis(2-cyanoisopropyl)-o-toluenesulfonamide, N,N-bis(2-cyanoethyl) xylenesulfonamide, N,N-bis(cyanomethyl) cumenesulfonamide, N-2 - cyanoethyl-N-cyanomethyl toluenesulfonamide, N,N - bis(2 - cyanoethyl) biphenylsulfonamide, N,N-bis(2-cyanoethyl)-beta-naphthalenesulfonamide, N,N-bis(2-cyanoethyl) 2,3,6-trimethylbenzenesulfonamide, N,N - bis(2 - cyanoethyl) isopropylbiphenylsulfonamide, N,N - bis(cyanomethyl) cymenesulfonamide, N,N-bis(2-cyanoethyl) 2,3,6-trimethylbenzenesulfonamide and N,N-bis(2-cyanobutyl) toluenesulfonamide;

(f) *Hydrocarbons*, for example, polyphenyls such as o-terphenyl, p-terphenyl, m-terphenyl and mixtures thereof, and partially hydrogenated terphenyl; chlorinated polyphenyls such as chlorinated o-terphenyl, p-terphenyl, m-terphenyl and mixtures thereof and chlorinated biphenyl; alkylated polyphenyls such as isopropyl biphenyl, diisopropyl biphenyl and isopropyl terphenyl; alkyl aryl hydrocarbons such as triethyl benzene, tetraethyl benzene, hexaethyl benzene, diisopropyl benzene, triisopropyl benzene, di-n-propyl benzene, di-n-butyl benzene and partially hydrogenated alkyl aryl hydrocarbon (partially hydrogenated terphenyl and the partially hydrogenated alkyl aryl hydrocarbon are marketed as HB–40 and HB–20 respectively by Monsanto Chemical Co.).

(g) *Cyanamides*, such as dibutyl cyanamide, di-2-ethylhexyl cyanamide, diallyl cyanamide, methyl γ-phenylpropyl cyanamide, ethyl γ-phenylpropyl cyanamide, propyl phenylpropyl cyanamide, butyl benzyl cyanamide, 2-ethylhexyl benzyl cyanamide, isodecyl benzyl cyanamide and dibenzyl cyanamide;

(h) *Epoxy compounds*, for example, epoxy esters containing a long carbon chain such as glycidyl laurate, methyl 9,10-epoxyoctadecanoate, diethylene glycol, di-9,10 - epoxyoctadecanoate, 9,10 - epoxyoctadecanyl acetate, 9,10-epoxyoctadecanyl octadecanoate, esters of polycarboxylic acids and alcohols containing a

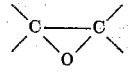

group such as di-2-ethyl hexyl epoxy succinate, butyl glycidyl phthalate, diglycidyl phthalate, propylene glycol diglycidyl phthalate, diethylene glycol diglycidyl maleate, 2-ethyl hexyl glycidyl adipate, hexyl glycidyl sebacate and other esters of these and other polycarboxylic acids containing at least a

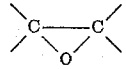

group; glycidols, such as glycidol, beta-methyl glycidol, beta-ethyl glycidol, beta-hydroxymethyl glycidol and diisobutenyl dioxide; epoxidized ethers such as alkyl glycidol ethers in which the alkyl group contains 1–5 carbon atoms, e.g., methyl, ethyl, propyl, butyl, amyl glycidyl ethers; glycidyl ethers containing unsaturated groups, such as vinyl, allyl and methylallyl glycidyl ethers, phenyl glycidyl ether, tolyl glycidyl ether, naphthyl glycidyl ether, cyclopentyl glycidyl ether and cyclohexyl glycidyl ether; glycidyl ethers of such polyhydric alcohols as glycerin, diglycerol, erythritol, pentaglycerol, pentaerythritol, mannitol, sorbitol, polyallyl alcohol, polymethallyl alcohol, polyvinyl alcohol, ethylene glycol, propylene glycol and butylene glycol; glycidyl ethers of polyhydric phenols, for example, mono-nuclear phenols like resorcinol, catechol and hydroquinone; and polynuclear phenols like bis-(4-hydroxyphenyl)-2,2-propane (bisphenol), 4,4'-dihydroxy benzophenone, bis-(4-hydroxyphenyl)-1,1-ethane, bis-(4-hydroxyphenyl) - 1,1-propane, bis-(4-hydroxyphenyl)-1,1-isobutane, bis-(4-hydroxyphenyl) - 2,2 - butane, bis-(4-hydroxy-2 - methylphenyl) - 2,2 - propane, bis-(4-hydroxy-2-tert.-butylphenyl) - 2,2 - propane, bis-(2-dihydroxy-naphthyl) - methane, 1,5 - dihydroxy naphthalene, phloroglucinol, 1,4-dihydroxy naphthalene, 9,10-dihydroxy anthracene, 1,3,6 - trihydroxy naphthalene, 4,4 - dihydroxy diphenyl, 2,2-bis(4-hydroxyphenyl) propane and 1,4-bis(4-hydroxyphenyl)-cyclohexane, etc.

As the first step in the process of plasticizing the polycarbonate resins, the plasticizer and resin can be thoroughly and intimately intermixed by means well known in the art, as for example, by stirring or grinding. The plasticizer can also be mixed by adding the plasticizer to a solution of the resin in a suitable solvent and evaporating the solvent to obtain a homogeneous plasticizer-resin mixture. Suitable solvents include benzene, toluene, chlorobenzene, dioxane, methylene chloride, ethylene dichloride, trichloroethylene, acetylene tetrachloride and the like.

The plasticizer-resin mixture is heated slowly to above the melting temperature of the polycarbonate resin as modified by the presence of the plasticizer and held at that temperature until the fused mixture is clear and transparent. The temperature to which the plasticizer-resin mixture is heated will depend not only on the melting temperature of the specific polycarbonate resin but also on the temperature lowering effect of the plasticizer or plasticizers being used. The melting temperature of polycarbonate resins generally falls within the range of about 150° C. to about 300° C. Some polycarbonate resins, however, have melting temperatures which are much lower, for example, 65° C. It is not contemplated that the plasticizer-resin mixture will be heated above its decomposition temperature.

The fused mixture is then quench cooled to reduce the temperature of the final product to at least below about 50° C. and preferably to room temperature as quickly as possible. The quench cooling may be accomplished by various means well known in the art, for example, by means of an ice water bath, ice bath, cold rolling or cold air bath.

The particular cooling technique described above is an essential feature of this invention. Polycarbonate resins at room temperature are normally hard, rigid and tough materials. The addition of plasticizers to crystallizable polymers normally increases their rate of crystallization. Many of the materials that are commonly used as plasticizers for other polymers, such as vinyl resins, increase the rate of crystallization of polycarbonate resins to such an extent, under the normal procedure used in the art, that they cannot be satisfactorily incorporated into the polycarbonate resin. Crystallization is speeded up markedly at slightly elevated temperatures, for example 50–100° C. Consequently, allowing a melted plasticized polycarbonate resin to slowly cool to room temperature, under normal procedures well known in the plasticizer art, results in rapid crystallization of the polycarbonate resin. The resultant plastic mass is cheesy and milky, and exudation of the plasticizer is experienced. Quench cooling apparently develops sufficient viscosity to avoid rapid crystallization.

The plasticizer can be incorporated into the polycarbonate resins over a wide range of concentrations. Generally speaking, from about 5 to about 200 parts by weight of plasticizer can be used per 100 parts by weight of resin. However, in preferred formulations, from about 25 to about 100 parts by weight of plasticizer are used per 100 parts by weight of resin.

It will be appreciated by those skilled in the art that the choice and amount of the various components of the compositions of the invention will be subject to adjustment and correlation, depending upon the use for which the composition is intended and the result desired.

To illustrate the manner in which the invention can be carried out, the following examples are given. It is to be understood that such examples are for the purpose of illustration only, and that the invention is not limited to specific compounds or conditions recited therein. Unless otherwise specified, parts disclosed in the following examples and throughout this disclosure are parts by weight.

The compositions of Table I are prepared by (1) stirring together, in weight proportions set forth below, a polycarbonate resin and a compatible plasticizer to form an intimate mixture, (2) heating the plasticizer-resin mixture to a temperature within the range of from about 200° C. to about 240° C. to obtain af used, clear, transparent plastic composition and (3) quench cooling the fused material in water to below room temperature.

The finished products of the examples of Table I are characterized by the physical properties shown in Table II below.

Table I

| Formulation No. | Resin | Parts | Plasticizer | Parts |
|---|---|---|---|---|
| 1 | Polycarbonate* | 100 | | 0 |
| 2 | do* | 90 | Butyl benzyl phthalate | 10 |
| 3 | do* | 80 | do | 20 |
| 4 | do* | 70 | do | 30 |
| 5 | do* | 75 | Benzyl cyclohexyl phthalate | 25 |
| 6 | do* | 67 | do | 33 |
| 7 | do* | 50 | do | 50 |
| 8 | do* | 75 | Cresyl benzyl phthalate | 25 |
| 9 | do* | 67 | do | 33 |
| 10 | do* | 50 | do | 50 |
| 11 | do* | 75 | Tetrabutyl pyromellitate | 25 |
| 12 | do* | 67 | do | 33 |
| 13 | do* | 50 | do | 50 |
| 14 | do* | 75 | Methyl phthalyl ethyl glycollate | 25 |
| 15 | do* | 67 | do | 33 |
| 16 | do* | 50 | do | 50 |
| 17 | do* | 75 | Ethyl phthalyl ethyl glycollate | 25 |
| 18 | do* | 67 | do | 33 |
| 19 | do* | 50 | do | 50 |
| 20 | do* | 75 | Butyl phthalyl butyl glycollate | 25 |
| 21 | do* | 67 | do | 33 |
| 22 | do* | 50 | do | 50 |
| 23 | do* | 75 | Dibenzyl sebacate | 25 |
| 24 | do* | 67 | do | 33 |
| 25 | do* | 50 | do | 50 |
| 26 | do* | 75 | Dibenzyl adipate | 25 |
| 27 | do* | 67 | do | 33 |
| 28 | do* | 75 | Dimethylene glycol dibenzoate | 25 |
| 29 | do* | 67 | do | 33 |
| 30 | do* | 50 | do | 50 |
| 31 | do* | 75 | Dipropylene glycol dibenzoate | 25 |
| 32 | do* | 67 | do | 33 |
| 33 | do* | 50 | do | 50 |
| 34 | do* | 75 | 3-methyl-1,5-pentanediol dibenzoate | 25 |
| 35 | do* | 67 | do | 33 |
| 36 | do* | 50 | do | 50 |
| 37 | do* | 75 | Tricresyl phosphate | 25 |
| 38 | do* | 67 | do | 33 |
| 39 | do* | 50 | do | 50 |
| 40 | do* | 75 | Cresyl diphenyl phosphate | 25 |
| 41 | do* | 67 | do | 33 |
| 42 | do* | 50 | do | 50 |
| 43 | do* | 75 | 2-ethylhexyl diphenyl phosphate | 25 |
| 44 | do* | 67 | do | 33 |
| 45 | do* | 50 | do | 50 |
| 46 | do* | 75 | 2-ethylhexyl dicresyl phosphate | 25 |
| 47 | do* | 67 | do | 33 |
| 48 | do* | 50 | do | 50 |
| 49 | do* | 75 | N-ethyl-o-p-toluene sulfonamide | 25 |
| 50 | do* | 67 | do | 33 |
| 51 | do* | 50 | do | 50 |
| 52 | do* | 75 | Poly (allyl glycidyl ether) | 25 |
| 53 | do* | 67 | do | 33 |
| 54 | do* | 50 | do | 50 |
| 55 | do* | 75 | Dibenzyl cyanamide | 25 |
| 56 | do* | 67 | do | 33 |
| 57 | do* | 50 | do | 50 |

*Polycarbonate of 2,2-di(4-hydroxyphenyl) propane.

Table II

| Formulation No. | Compatibility | Clarity | Flexibility | Tensile properties | | | | Days to cloudiness | | Appearance of sheet 900 days at 25° C. | |
|---|---|---|---|---|---|---|---|---|---|---|---|
| | | | | 1% mod. | Yield | Break | Elong., percent | 25° C. | 50° C. | Clarity | Flexibility |
| 1 | | Clear | Brittle | 232,000 | 7,890 | 7,850 | 70 | | | | |
| 2 | Compatible | Clear | Brittle | | 7,705 | 6,680 | 28 | | | | |
| 3 | do | Hazy | Sl. flexible | | 6,002 | 5,670 | 39 | | | | |
| 4 | do | Cloudy | Flexible | | 785 | 785 | 10 | | | | |
| 5 | do | Clear | Rigid | 267,000 | 8,800 | | 5 | >60 | >60 | Clear | Rigid. |
| 6 | do | do | do | 261,000 | 7,330 | 6,542 | 11 | >60 | >60 | do | Do. |
| 7 | do | do | Sl. flexible | 15,800 | 318 | 1,723 | 168 | >60 | >30 | do | Very flexible. |
| 8 | do | do | Flexible | 180,000 | 7,220 | 6,770 | 5 | >30 | >30 | do | Flexible. |
| 9 | do | do | do | 276,000 | 7,620 | | 5 | >30 | >30 | do | Do. |
| 10 | do | do | do | 3,900 | 148 | 900 | 222 | >30 | 10 | do | Very flexible. |
| 11 | do | do | do | 293,000 | 6,995 | 5,000 | 35 | >60 | >60 | do | Flexible. |
| 12 | do | do | do | 62,600 | 1,693 | 2,873 | 106 | >60 | 30 | do | Do. |
| 13 | do | do | do | 1,560 | 42 | 339 | 315 | 7 | 1 | Milky | Do. |
| 14 | do | do | do | 275,000 | 9,295 | 6,540 | 38 | >30 | >30 | Clear | Do. |
| 15 | do | do | do | 266,000 | 8,185 | 5,700 | 68 | >30 | >30 | do | Do. |
| 16 | do | do | do | 19,100 | 290 | 1,370 | 185 | >30 | >30 | do | Do. |
| 17 | do | do | do | 237,000 | 7,710 | 7,170 | 10 | >30 | 10 | do | Do. |
| 18 | do | do | do | 266,000 | 9,370 | 7,625 | 27 | >30 | 10 | do | Do. |
| 19 | do | do | do | 16,000 | 393 | 1,263 | 175 | >30 | 2 | Cloudy | Do. |
| 20 | do | do | do | 183,000 | 5,720 | 3,746 | 49 | >60 | >60 | Clear | Do. |
| 21 | do | do | do | 131,000 | 3,788 | 3,006 | 84 | >60 | 30 | Cloudy | Do. |
| 22 | do | do | Very Flex | | | | | 4 | | Milky | Very flex. |
| 23 | do | do | Flexible | 63,600 | 1,922 | 1,930 | 54 | 30-60 | >60 | Cloudy | Flexible. |
| 24 | do | do | do | 1,000 | 61 | 654 | 200 | 30-60 | >60 | Cloudy | Do. |
| 25 | do | do | Very flex | | | | | 4 | | Milky | Very flex. |
| 26 | do | do | Flexible | 67,000 | 1,740 | 1,250 | 88 | >30 | 10 | Clear | Flexible. |
| 27 | do | do | do | 2,100 | 51 | 327 | 261 | >30 | 10 | Cloudy | Do. |
| 28 | do | do | do | 207,000 | 6,740 | 4,250 | 57 | >30 | >30 | Clear | Do. |
| 29 | do | do | do | 51,000 | 1,056 | 1,703 | 118 | >30 | 2 | do | Do. |
| 30 | do | do | do | | | | 12 | 2 | 2 | Milky | Do. |
| 31 | do | do | do | 260,000 | 6,655 | | 13 | >30 | >30 | Clear | Do. |
| 32 | do | do | do | 166,000 | 5,783 | 3,550 | 74 | >30 | 2 | Cloudy | Do. |
| 33 | do | do | do | 23,000 | 113 | 960 | 224 | >30 | 2 | Milky | Do. |
| 34 | do | do | do | 185,000 | 6,883 | 3,920 | 53 | >30 | >30 | Clear | Do. |
| 35 | do | do | do | 96,000 | 3,000 | 2,630 | 78 | >30 | 10 | Cloudy | Do. |
| 36 | do | do | do | | 30 | 30 | 464 | 3-4 | 2 | Milky | Do. |
| 37 | do | do | Rigid | 241,000 | 7,172 | 6,045 | 5 | >60 | >30 | Clear | Rigid. |
| 38 | do | do | do | 97,000 | 2,945 | 2,875 | 89 | >60 | 30 | Cloudy | Do. |
| 39 | do | do | Flexible | | | 34 | 510 | 30 | | Milky | Flexible. |
| 40 | do | do | do | 235,000 | 7,068 | 6,150 | 8 | >60 | >60 | Clear | Do. |
| 41 | do | do | do | 181,000 | 5,393 | 3,623 | 90 | >60 | >60 | Clear | Do. |
| 42 | do | do | do | | | | | 7 | | Milky | Do. |
| 43 | do | do | Rigid | 219,000 | 6,123 | 4,195 | 65 | >60 | >60 | Clear | Rigid. |
| 44 | do | do | do | 86,000 | 2,227 | 2,580 | 114 | >60 | 30 | Cloudy | Do. |
| 45 | do | do | Flexible | | | | | 3-4 | | Milky | Flexible. |
| 46 | do | do | do | 256,000 | 6,997 | 4,473 | 26 | >60 | >60 | Clear | Do. |
| 47 | do | do | do | 64,000 | 1,833 | 2,777 | 103 | >60 | 30 | Cloudy | Do. |
| 48 | do | do | do | | | 11 | 737 | 3-4 | | Milky | Do. |
| 49 | do | do | Rigid | 358,000 | 10,573 | 9,326 | 8 | >60 | >60 | Clear | Rigid. |
| 50 | do | do | do | 272,000 | 9,190 | | 4 | >60 | >60 | do | Do. |
| 51 | do | do | Flexible | 60,000 | 708 | 1,025 | 105 | >60 | 1 | do | Flexible. |
| 52 | do | do | do | 250,000 | 9,040 | | 4 | >60 | >60 | do | Do. |
| 53 | do | do | do | 247,000 | 8,675 | | 4 | >60 | >60 | do | Do. |
| 54 | do | do | Very Flex | 136,000 | 4,243 | 3,345 | 50 | >60 | 30 | do | Very flex. |
| 55 | do | do | Flexible | 242,000 | 7,892 | | 4 | >60 | >60 | do | Flexible. |
| 56 | do | do | do | 176,000 | 5,526 | | 5 | >60 | >60 | do | Do. |
| 57 | do | do | do | | | | | 3-4 | | Milky | Do. |

It can be readily seen that plasticizers heretofore widely used for softening polymers and copolymers, for example, vinyl halide polymers and copolymers, are applicable in accordance with this invention for use in polycarbonate resin plasticization. Films and sheets prepared from plasticized polycarbonates are clear, flexible, tough and exhibit excellent tensile properties.

Equally satisfactory and advantageous results are obtained upon replacing the polycarbonate resin used in the compositions of Table I with other polycarbonate resins obtained from di-(monohydroxyaryl) alkanes such as Di-(4-hydroxyphenyl)methane,
1,1-di(4-hydroxyphenyl)ethane,
1,1-di(4-hydroxyphenyl)propane,
1,1-di(4-hydroxyphenyl)butane,
1,1-di(4-hydroxyphenyl)isobutane,
1,1-di(4-hydroxyphenyl)cyclopentane,
1,1-di(4-hydroxyphenyl)cyclohexane,
2,2-di(4-hydroxyphenyl)butane,
2,2-di(4-hydroxyphenyl)pentane,
2,2-di(4-hydroxyphenyl)hexane,
2,2-di(4-hydroxyphenyl)heptane,
2,2-di(4-hydroxyphenyl)octane,
2,2-di(4-hydroxyphenyl)nonane,
3,3-di(4-hydroxyphenyl)pentane,
4,4-di(4-hydroxyphenyl)heptane.

An additional and unexpected advantage obtained by the practice of this invention is the improvement in the light stability imparted to the polycarbonate resins by certain compatible plasticizers.

Such plasticizers are selected from the group consisting of alkyl phthalyl alkyl glycollates, aralkyl phthalyl alkyl glycollates, diakyl phthalates, alkyl benzyl phthalates, each having 1 to 10 carbons in the alkyl group, dibenzyl phthalate and glycidyl ethers of polyhydric alcohols.

Non-limiting examples of plasticizers encompassed by the aforementioned classes of plasticizers include the following:

(a) *Phthalyl glycollates,* such as alkyl phthalyl alkyl glycollates, for example, methyl phthalyl methyl glycollate, methyl phthalyl ethyl glycollate, ethyl phthalyl ethyl glycollate, propyl phthalyl propyl glycollate, butyl phatalyl butyl glycollate, isobutyl phthalyl isobutyl glycollate, hexyl phthalyl hexyl glycollate, cyclohexyl phthalyl cyclohexyl glycollate, 2-ethylhexyl phthalyl 2-ethylhexyl glycollate and decyl phthalyl decyl glycollate; aralkyl phthalyl alkyl glycollates such as benzyl phthalyl ethyl glycollate, benzyl phthalyl butyl glycollate and benzyl phthalyl decyl glycollate;

(b) *Phthalates,* such as dimethyl phthalate, diethyl phthalate, dipropyl phthalate, dibutyl phthalate, diisobutyl phthalate, diamyl phthalate, dihexyl phthalate, di-n-octyl phthalate, diisoctyl phthalate, dicapryl phthalate, di-(2- ethylhexyl)phthalate, dinonyl phthalate, didecyl phthalate, butyl isohexyl phthalate, butyl octyl phthalate, decyl butyl phthalate, octyl decyl phthalate, butyl cyclohexyl phthalate, dicyclohexyl phthalate, methylcyclohexyl isobutyl phthalate, di-(methylcyclohexy)phthalate, butyl benzyl phthalate, hexyl benzyl phthalate, octyl benzyl phthalate, benzyl cyclohexyl phthalate and dibenzyl phthalate;

(c) *Glycidyl ethers of polyhydric alcohols*, such as glycerin, diglycerol, erythritol, pentaglycerol, pentaerythritol, mannitol, sorbitol, polyallyl alcohol, polymethallyl alcohol, polyvinyl alcohol, ethylene glycol, propylene glycol and butylene glycol.

Plasticized polycarbonate resins prepared as previously shown by the method of this invention were exposed to ultra-violet rays in a standard Fade-Ometer at a temperature of 60–65° C. In all determinations, observations were made on test samples before, during and after exposure, until a visual color change or darkening demonstrated the beginning of deterioration resulting from the exposure.

The examples set forth in Table III show particularly outstanding results in improvement of light stability imparted to polycarbonate resins by certain compatible plasticizers. The formulation numbers in Table III refer to the same formulations as indicated in Table I.

*Table III*

| Formulation No.: | Light stability, first evidence of deterioration at Fade-Ometer hours |
| --- | --- |
| 1 (unplasticized polycarbonate resin) | 200 |
| 6 | 300 |
| 15 | 300 |
| 18 | 400 |
| 53 | 300 |

As may be readily observed, various compatible plasticizers in plasticizing amounts significantly improve the light stability of polycarbonate resins.

In addition to the resin and the plasticizer, the compositions of this invention may also contain pigments, fillers, colors, solvents and other conventional modifiers and additives. A single plasticizer may be used or a mixture of one or more of the plasticizers of this invention may be used together with other plasticizers known to the art. These and other variations in compounding of resin formulations using the plasticizers of this invention, including variations in proportions, will be apparent to those skilled in the art and are within the spirit and scope of the appended claims.

The compositions prepared in accordance with the invention may be worked up in the usual manner, e.g. by extrusion, injection molding, molding, rolling, etc., into shaped articles, which in addition to the improved impact strength, possess all of the desirable properties of articles manufactured from hard rigid vinyl type polymers.

In addition to the aforementioned applications, the compositions of this invention may be used in protective film and coating applications wherein a hard desirable covering is obtained.

While this invention has been described with respect to certain embodiments it is not so limited, and it is to be understood that variations and modifications thereof may be made without departing from the spirit or scope of this invention.

The embodiments of the invention in which an exclusive property or privilege is claimed are defined as follows:

1. A method of plasticizing a polycarbonate resin which comprises (1) intimately admixing said resin with a compatible plasticizer, (2) heating the mixture above its melting temperature and (3) quench cooling the fused mixture to at least below 50° C.

2. A method of plasticizing a poly-(di-mono-hydroxyaryl alkane carbonate) resin comprising (1) intimately admixing said resin with a compatible plasticizer, (2) heating the mixture above its melting temperature and (3) quench cooling the fused mixture to at least below 50° C.

3. A method of plasticizing a poly-(di-mono-hydroxyaryl alkane carbonate) resin comprising (1) intimately admixing said resin with a compatible plasticizer, (2) heating the mixture above its melting temperature and (3) quench cooling the fused mixture to at least room temperature.

4. A method of claim 2 wherein the poly-(di-monohydroxyaryl alkane carbonate) is a polycarbonate of 1,1-di(4-hydroxyphenyl)propane.

5. A method of claim 2 wherein the poly-(di-mono-hydroxyaryl alkane carbonate) is a polycarbonate of 2,2-di-(4-hydroxyphenyl)propane.

6. A method of claim 2 wherein the poly-(di-mono-hydroxyaryl alkane carbonate) is a polycarbonate of 1,1-di-(4-hydroxyphenyl)cyclohexane.

7. A method of plasticizing a poly-(di-mono-hydroxyaryl alkane carbonate) resin comprising (1) intimately admixing from about 5 to about 200 parts by weight of a compatible plasticizer with 100 parts by weight of said resin, (2) heating the mixture above its melting temperature and (3) quench cooling the fused mixture to at least below 50° C.

8. A method of plasticizing a poly-(di-mono-hydroxyaryl alkane carbonate) resin comprising (1) intimately admixing from about 25 to about 100 parts by weight of a compatible plasticizer with 100 parts by weight of said resin, (2) heating the mixture above its melting temperature and (3) quench cooling the fused mixture to at least below 50° C.

9. A clear, substantially homogeneous plasticized resin composition comprising a polycarbonate resin and a compatible plasticizer selected from the group consisting of:

(a) esters having up to 22 carbon atoms formed by the reaction of an aliphatic monocarboxylic acid having from 2 to 18 carbon atoms and an alcohol selected from the group consisting of monohydric alcohols having from 1 to 6 carbon atoms, dihydric alcohols having from 2 to 8 carbon atoms, glycerol, tetrahydrofurfuryl alcohol, and ether alcohols having from 2 to 8 carbon atoms;

(b) esters formed by the reaction of an aliphatic polycarboxylic acid having from 6 to 10 carbon atoms and an alcohol selected from the group consisting of monohydric alcohols having from 1 to 11 carbon atoms, tetrahydrofurfuryl alcohol and ether alcohols having from 2 to 8 carbon atoms;

(c) esters formed by the reaction of an aryl carboxylic acid having from 7 to 10 carbon atoms and an alcohol selected from the group consisting of monohydric alcohols having from 1 to 13 carbon atoms, dihydric alcohols having from 2 to 6 carbon atoms, glycerol, pentaerythritol, phenols having from 6 to 8 carbon atoms, tetrahydrofurfuryl alcohol, and ether alcohols having from 2 to 8 carbon atoms;

(d) sulfonamides selected from the group consisting of N-alkyl and N-allyl arylsulfonamides, arylsulfonamides, hydroxyalkyl arylsulfonamides, N,N-dialkyl arylsulfonamides and N,N-bis(cyanoalkyl) arylsulfonamides;

(e) hydrocarbons selected from the group consisting of polyphenyls, chlorinated polyphenyls, alkylated polyphenyls, partially hydrogenated polyphenyls, alkyl aryl hydrocarbons and partially hydrogenated alkyl aryl hydrocarbons wherein the alkyl group contains from 2 to 4 carbons;

(f) cyanamides selected from the group consisting of allyl cyanamide, alkyl cyanamides and aralkyl cyanamides wherein the alkyl group contains from about 1 to about 10 carbon atoms and the aralkyl group contains from about 7 to about 9 carbon atoms; and (g) epoxy compounds selected from the group consisting of epoxy esters, glycidols, and glycidyl ethers.

10. A clear, substantially homogeneous plasticized resin composition comprising a poly-(di-mono-hydroxyaryl alkane carbonate) and a compatible plasticizer selected from the group consisting of:
- (a) esters having up to 22 carbon atoms formed by the reaction of an aliphatic monocarboxylic acid having from 2 to 18 carbon atoms and an alcohol selected from the group consisting of monohydric alcohols having from 1 to 6 carbon atoms, dihydric alcohols having from 2 to 8 carbon atoms, glycerol, tetrahydrofurfuryl alcohol, and ether alcohols having from 2 to 8 carbon atoms;
- (b) esters formed by the reaction of an aliphatic polycarboxylic acid having from 6 to 10 carbon atoms and an alcohol selected from the group consisting of monohydric alcohols having from 1 to 11 carbon atoms, tetrahydrofurfuryl alcohol and ether alcohols having from 2 to 8 carbon atoms;
- (c) esters formed by the reaction of an aryl carboxylic acid having from 7 to 10 carbon atoms and an alcohol selected from the group consisting of monohydric alcohols having from 1 to 13 carbon atoms, dihydric alcohols having from 2 to 6 carbon atoms, glycerol, pentaerythritol, phenols having from 6 to 8 carbon atoms, tetrahydrofurfuryl alcohol, and ether alcohols having from 2 to 8 carbon atoms;
- (d) sulfonamides selected from the group consisting of N-alkyl and N-allyl arylsulfonamides, arylsulfonamides, hydroxyalkyl arylsulfonamides, N,N-dialkyl arylsulfonamides and N,N-bis(cyanoalkyl) arylsulfonamides;
- (e) hydrocarbons selected from the group consisting of polyphenyls, chlorinated polyphenyls, alkylated polyphenyls, partially hydrogenated polyphenyls, alkyl aryl hydrocarbons and partially hydrogenated alkyl aryl hydrocarbons wherein the alkyl group contains from 2 to 4 carbons;
- (f) cyanamides selected from the group consisting of allyl cyanamide, alkyl cyanamides and aralkyl cyanamides wherein the alkyl group contains from about 1 to about 10 carbon atoms and the aralkyl group contains from about 7 to about 9 carbon atoms; and
- (g) epoxy compounds selected from the group consisting of epoxy esters, glycidols, and glycidyl ethers.

11. A clear, substantially homogeneous plasticized resin composition comprising 100 parts by weight of a poly-(di-mono-hydroxyaryl alkane carbonate) and from about 5 to about 200 parts by weight of a compatible plasticizer selected from the group consisting of:
- (a) esters having up to 22 carbon atoms formed by the reaction of an aliphatic monocarboxylic acid having from 2 to 18 carbon atoms and an alcohol selected from the group consisting of monohydric alcohols having from 1 to 6 carbon atoms, dihydric alcohols having from 2 to 8 carbon atoms, glycerol, tetrahydrofurfuryl alcohol, and ether alcohols having from 2 to 8 carbon atoms;
- (b) esters formed by the reaction of an aliphatic polycarboxylic acid having from 6 to 10 carbon atoms and an alcohol selected from the group consisting of monohydric alcohols having from 1 to 11 carbon atoms, tetrahydrofurfuryl alcohol and ether alcohols having from 2 to 8 carbon atoms;
- (c) esters formed by the reaction of an aryl carboxylic acid having from 7 to 10 carbon atoms and an alcohol selected from the group consisting of monohydric alcohols having from 1 to 13 carbon atoms, dihydric alcohols having from 2 to 6 carbon atoms, glycerol, pentaerythritol, phenols having from 6 to 8 carbon atoms, tetrahydrofurfuryl alcohol, and ether alcohols having from 2 to 8 carbon atoms;
- (d) sulfonamides selected from the group consisting of N-alkyl and N-allyl arylsulfonamides, arylsulfonamides, hydroxyalkyl arylsulfonamides, N,N-dialkyl arylsulfonamides and N,N-bis(cyanoalkyl) arylsulfonamides;
- (e) hydrocarbons selected from the group consisting of polyphenyls, chlorinated polyphenyls, alkylated polyphenyls, partially hydrogenated polyphenyls, alkyl aryl hydrocarbons and partially hydrogenated alkyl aryl hydrocarbons wherein the alkyl group contains from 2 to 4 carbons;
- (f) cyanamides selected from the group consisting of allyl cyanamide, alkyl cyanamides and aralkyl cyanamides wherein the alkyl group contains from about 1 to about 10 carbon atoms and the aralkyl group contains from about 7 to about 9 carbon atoms; and
- (g) epoxy compounds selected from the group consisting of epoxy esters, glycidols, and glycidyl ethers.

12. A clear, substantially homogeneous plasticized resin composition comprising 100 parts by weight of a poly-(di-mono-hydroxyaryl alkane carbonate) and from about 25 to about 100 parts by weight of a compatible plasticizer selected from the group consisting of:
- (a) esters having up to 22 carbon atoms formed by the reaction of an aliphatic monocarboxylic acid having from 2 to 18 carbon atoms and an alcohol selected from the group consisting of monohydric alcohols having from 1 to 6 carbon atoms, dihydric alcohols having from 2 to 8 carbon atoms, glycerol, tetrahydrofurfuryl alcohol, and ether alcohols having from 2 to 8 carbon atoms;
- (b) esters formed by the reaction of an aliphatic polycarboxylic acid having from 6 to 10 carbon atoms and an alcohol selected from the group consisting of monohydric alcohols having from 1 to 11 carbon atoms, tetrahydrofurfuryl alcohol and ether alcohols having from 2 to 8 carbon atoms;
- (c) esters formed by the reaction of an aryl carboxylic acid having from 7 to 10 carbon atoms and an alcohol selected from the group consisting of monohydric alcohols having from 1 to 13 carbon atoms, dihydric alcohols having from 2 to 6 carbon atoms, glycerol, pentaerythritol, phenols having from 6 to 8 carbon atoms, tetrahydrofurfuryl alcohol, and ether alcohols having from 2 to 8 carbon atoms;
- (d) sulfonamides selected from the group consisting of N-alkyl and N-allyl arylsulfonamides, arylsulfonamides, hydroxyalkyl arylsulfonamides, N,N-dialkyl arylsulfonamides and N,N-bis(cyanoalkyl) arylsulfonamides;
- (e) hydrocarbons selected from the group consisting of polyphenyls, chlorinated polyphenyls, alkylated polyphenyls, partially hydrogenated polyphenyls, alkyl aryl hydrocarbons and partially hydrogenated alkyl aryl hydrocarbons wherein the alkyl group contains from 2 to 4 carbons;
- (f) cyanamides selected from the group consisting of allyl cyanamide, alkyl cyanamides and aralkyl cyanamides wherein the alkyl group contains from about 1 to about 10 carbon atoms and the aralkyl group contains from about 7 to about 9 carbon atoms; and
- (g) epoxy compounds selected from the group consisting of epoxy esters, glycidols, and glycidyl ethers.

13. The composition of claim 12 wherein the poly-(di-mono-hydroxyaryl alkane carbonte) is a polycarbonate of a 1,1-di-(4-hydroxyaryl)alkane.

14. The composition of claim 13 wherein the polycarbonate of a 1,1-di-(4-hydroxyaryl)alkane is a polycarbonate of 1,1-di-(4-hydroxyphenyl)propane.

15. The composition of claim 13 wherein the polycarbonate of a 1,1-di-(4-hydroxyaryl)alkane is a polycarbonate of a 1,1-di-(4-hydroxyphenyl)cyclohexane.

16. The composition of claim 12 wherein the poly-(di-mono-hydroxyaryl alkane carbonate) is a polycarbonate of a 2,2-di-(4-hydroxyaryl)alkane.

17. The composition of claim 16 wherein the polycarbonate of a 2,2-di-(4-hydroxyaryl) alkane is a polycarbonate of a 2,2-di-(4-hydroxyphenyl)propane.

18. A composition resistant to the deteriorating effects of light, comprising a polycarbonate resin and an alkyl phthalyl alkyl glycollate wherein each alkyl has 1 to 10 carbons.

19. A composition resistant to the deteriorating effects of light, comprising a polycarbonate resin and an aralkyl phthalyl alkyl glycollate wherein each alkyl group contains 1 to 10 carbons.

20. A composition resistant to the deteriorating effects of light, comprising a polycarbonate resin and a dialkyl phthalate wherein each alkyl group contains 1 to 10 carbons.

21. A composition resistant to the deteriorating effects of light, comprising a polycarbonate resin and an alkyl benzyl phthalate wherein the alkyl group contains 1 to 10 carbons.

22. A composition resistant to the deteriorating effects of light, comprising a polycarbonate resin and dibenzyl phthalate.

23. A composition resistant to the deteriorating effects of light, comprising a polycarbonate resin and a glycidyl ether of a polyhydric alcohol.

References Cited by the Examiner

UNITED STATES PATENTS

| | | | |
|---|---|---|---|
| 2,589,417 | 3/52 | Mittelmann | 260—34.2 |
| 3,071,556 | 1/63 | Bolgiano | 260—32.4 |

ALEXANDER H. BRODMERKEL, *Primary Examiner.*

MORRIS LIEBMAN, *Examiner.*